Patented Mar. 3, 1953

2,630,451

UNITED STATES PATENT OFFICE 2,630,451

DITHIOPHOSPHATE ESTERS

John H. Fletcher and Erick I. Hoegberg, Stamford, Conn., assignors to American Cyanamid Company, New York, N. Y., a corporation of Maine No Drawing. Application December 8, 1951, Serial No. 260,758

6 Claims. (Cl. 260—461)

The present invention is concerned with dithiophosphate esters and is particularly directed to compounds of the formula

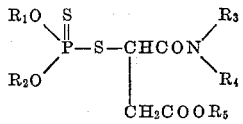

wherein $R_1$, $R_2$ and $R_3$ are selected from the group consisting of alkyl and aryl radicals, and $R_4$ and $R_5$ are selected from the group consisting of hydrogen and alkyl radicals.

Several methods may be employed for the preparation of the new phosphate esters. A preferred procedure consists in reacting an acid dithiophosphate of the formula

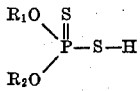

with an N-substituted maleamic acid of the formula

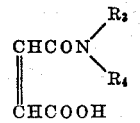

to produce as an intermediate a 1-carbamyl-2-carboxyethyl dithiophosphate of the formula

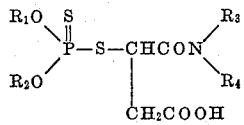

in which the R's have the same meaning as stated above. This intermediate is then converted to the acid chloride by means of thionyl chloride, followed by reaction with the desired alcohol.

The initial step of this reaction to obtain the intermediate takes place at temperatures of from about 20° to 150° C. depending upon the particular reactants employed. The reaction is somewhat exothermic in the early stages and some cooling means may be required.

In the second step of the procedure it is advantageous to employ an inert diluent and to operate under reflux to avoid loss of the thionyl chloride. Suitable diluents are benzene, toluene, xylene, chlorobenzene, chloroform and carbon tetrachloride.

The N-substituted maleamic acids utilized in the initial step of the above method may be prepared according to known methods involving the reaction of maleic anhydride with primary and secondary amines.

An alternative method for preparing the 1-carbamyl-2-carboxyethyl dithiophosphate intermediate comprises reacting the desired acid dithiophosphate with maleic anhydride to form a 2,5-dioxo-3-oxolanyl dithiophosphate, followed by reaction with the desired amine. These reactions (the R's having the meaning shown above) may be illustrated as follows:

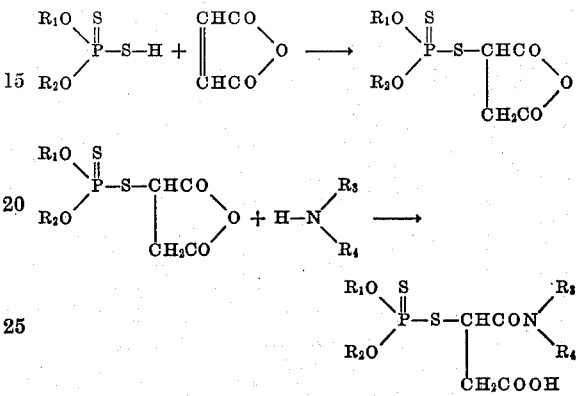

The new phosphate esters are, for the most part, oily liquids or low melting solids, substantially insoluble in water, and somewhat soluble in many organic solvents. They are of particular value as toxic constituents of insecticidal compositions. They are also useful as plasticizers, corrosion inhibitors, and petroleum additives.

The following examples will further illustrate the invention:

EXAMPLE 1

O,O-diethyl S-[2-carbethoxy-1-(ethylcarbamyl)-ethyl]dithiophosphate

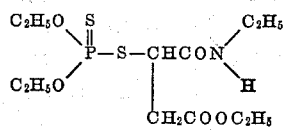

14.3 grams of N-ethylmaleamic acid was added slowly and with stirring to 20 grams of O,O-diethyl dithiophosphoric acid (93% purity). Some heat of reaction was evolved and the mixture was placed in a 65° C. oven for two hours. The product, O,O-diethyl S-[2-carboxy-1-(ethylcarbamyl)ethyl] dithiophosphate, was a viscous, amber-colored liquid which solidified when allowed to stand at room temperature. 22.8 grams of this product dissolved in 75 cc. of benzene was warmed to 60° C. in a vessel equipped with a stirrer, thermometer and reflux condenser. 8.3 grams of thionyl chloride was added dropwise over a period of one-half hour, giving a vigorous reaction with evolution of hydrogen chloride and sulfur dioxide. The mixture was stirred for two hours while the temperature dropped gradually to 30° C., 50 cc. of absolute ethyl alcohol was added and the mixture was allowed to stand for five days at 25° C. The reaction mixture was stripped of solvent by distillation under vacuum, leaving a brown oil which was dissolved in 50 cc. of benzene and washed with dilute aqueous sodium bicarbonate solution. The organic layer was separated, dried over anhydrous magnesium sulfate and stripped of benzene under vacuum. The residual product, O,O-diethyl S-[2-carbethoxy-1-(ethylcarbamyl)ethyl] dithiophosphate, was a dark brown, oily liquid having a refractive index $n_D^{25}$ 1.5281.

EXAMPLE 2

*O,O-diethyl S-[2-carbethoxy-1-(isobutylcarbamyl)ethyl] dithiophosphate*

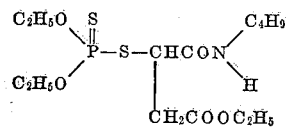

A mixture consisting of 34.2 grams of N-isobutylmaleamic acid and 38 grams of O,O-diethyl dithiophosphoric acid (98% purity) was heated with stirring on a steam bath for one hour. The product, O,O-diethyl S-[2-carboxy-1-(isobutylcarbamyl)ethyl] dithiophosphate, was a viscous, amber-colored oily liquid. 71 grams of this product was dissolved in 150 cc. of benzene and warmed to 60° C. 23.8 grams of thionyl chloride was added dropwise to the solution during a period of twenty minutes. The mixture was stirred and held at 60–70° C. for two hours, after which 100 cc. of absolute ethyl alcohol was added. The reaction mixture was allowed to stand at room temperature for three days, followed by removal of solvents by distillation under vacuum. The residual brown oily liquid was dissolved in 100 cc. of benzene, washed with dilute aqueous sodium bicarbonate solution and dried over anhydrous magnesium sulfate. The benzene was removed by distillation under vacuum. The residual product, O,O-diethyl S-[2-carbethoxy-1-(isobutylcarbamyl)ethyl] dithiophosphate, was a brown, viscous liquid having a refractive index $n_D^{25}$ 1.5189.

EXAMPLE 3

*O,O-diethyl S-[2-carbethoxy-1-(methylcarbamyl)ethyl] dithiophosphate*

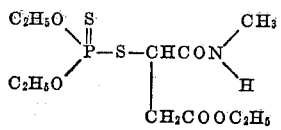

64.6 grams of N-methylmaleamic acid was added slowly with stirring to 96.2 grams of O,O-diethyl dithiophosphoric acid (96.7% purity). Some heat of reaction was evolved and the mixture was warmed on a steam bath for one hour. The product, O,O-diethyl S-[2-carboxy-1-(methylcarbamyl)ethyl] dithiophosphate, was a clear, yellow viscous liquid. 80 grams of this product was dissolved in 150 cc. of benzene and warmed to 45° C. 29.8 grams of thionyl chloride in 25 cc. of benzene was added slowly to the solution. The mixture was stirred for two hours, followed by the addition of 100 cc. of ethyl alcohol. After standing at room temperature for 24 hours, solvents were removed from the reaction mixture by distillation under vacuum. The residual oily liquid was dissolved in 100 cc. of benzene, washed with dilute aqueous sodium bicarbonate solution and dried over anhydrous magnesium sulfate. The benzene was removed by distillation under vaccum. The residual product, O,O-diethyl S-[2-carbethoxy-1-(methylcarbamyl)ethyl] dithiophosphate, was a brown oily liquid.

EXAMPLE 4

*O,O-diethyl S-[2-carbethoxy-1-(p-chlorophenylcarbamyl)ethyl]dithiophosphate*

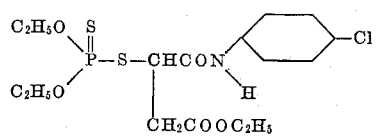

A mixture consisting of 34 grams of N-p-chlorophenylmaleamic acid and 28.5 grams of O,O-diethyl dithiophosphoric acid (98% purity) was heated at 65° C. with stirring for 4 hours. The product, O,O-diethyl S-[2-carboxy-1-(p-chlorophenylcarbamyl)ethyl] dithiophosphate, was a brown waxy solid. 61.8 grams of this product was dissolved in 100 cc. of benzene and warmed to 60° C. 17.9 grams of thionyl chloride in 20 cc. of benzene was added dropwise to the solution. The mixture was stirred and kept at 70° C. for one hour, after which 100 cc. of absolute ethyl alcohol was added. The reaction mixture was allowed to stand at room temperature for eighteen hours, followed by removal of solvents by distillation under vacuum. The residual brown waxy solid was recrystallized from isopropyl alcohol, followed by a second recrystallization from ethyl alcohol, giving a light brown crystalline product melting at 89–91° C.

EXAMPLE 5

*O,O-dipropyl S-[2-carbethoxy-1-(ethylcarbamyl)ethyl] dithiophosphate*

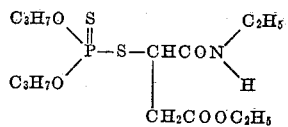

43 grams of N-ethylmaleamic acid was added slowly with stirring to 72.3 grams of O,O-dipropyl dithiophosphoric acid (89% purity). Some heat of reaction was evolved and the mixture was placed in a 65° C. oven for one hour. The product, O,O-dipropyl S-[2-carboxy-1-(ethylcarbamyl)ethyl] dithiophosphate, was a viscous brown oily liquid which solidified at room temperature. 57.6 grams of this product dissolved in 100 cc. of benzene was heated to 50° C. 17.9 grams of thionyl chloride was added dropwise over a period of one-half hour. The mixture was then heated to 75° C. with stirring for one and one-half hours. 100 cc. of absolute ethyl alcohol was added and the mixture was allowed to stand for twenty-four hours at 25° C. The reaction mixture was stripped of solvent by distillation under vacuum, leaving a brown oily liquid which was dissolved in 100 cc. of benzene and washed twice with dilute aqueous sodium bicarbonate solution. The organic layer

EXAMPLE 6

*O,O-diethyl S-[2-carbethoxy-1-(dimethylcarbamyl)ethyl] dithiophosphate*

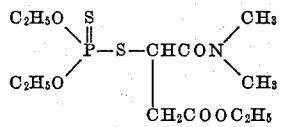

50.2 grams of N,N-dimethylmaleamic acid was added slowly with stirring to 66.6 grams of O,O-diethyl dithiophosphoric acid (98% purity). Considerable heat of reaction was evolved and the mixture was allowed to stand three hours. The product, O,O-diethyl S-[2-carboxy-1-(dimethylcarbamyl)ethyl] dithiophosphate, was a viscous, black, oily liquid. 58 grams of this product dissolved in 100 cc. of benzene was heated to 55° C. 20.8 grams of thionyl chloride was added dropwise, causing the temperature to rise to 60° C. The mixture was cooled to room temperature, followed by the addition of 100 cc. of absolute ethyl alcohol. After standing for eighteen hours at 20–25° C., the reaction mixture was stripped of benzene and excess ethyl alcohol by distillation under vacuum. The oily residue was dissolved in 100 cc. of benzene and washed with dilute aqueous sodium bicarbonate solution. The organic layer was dried over anhydrous magnesium sulfate and freed of benzene by vacuum distillation. The residual product was a dark brown oily liquid having a refractive index $n_D^{25}$ 1.5229.

EXAMPLE 7

*O,O-diethyl S-[2-carbobutoxy-1-(diethylcarbamyl)ethyl] dithiophosphate*

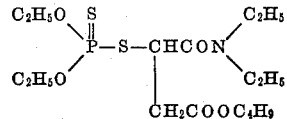

A mixture consisting of 9.8 grams of maleic anhydride and 20 grams of O,O-diethyl dithiophosphoric acid (93% purity) was warmed in a 65° C. oven for three hours, and then allowed to stand at room temperature for sixteen hours. The product, O,O-diethyl S-(2,5-dioxo-3-oxolanyl) dithiophosphate, was a brown, oily liquid. 28.4 grams of this product was dissolved in 70 cc. of benzene, and a solution of 7.3 grams of diethylamine in 30 cc. of benzene was added gradually during a period of one-half hour, the temperature being held at 25–30° C. with occasional ice-bath cooling. The mixture was stirred for one hour, followed by the gradual addition of 11.9 grams of thionyl chloride in 25 cc. of benzene. Stirring was continued for another hour and 7.5 grams of n-butyl alcohol was added dropwise. After standing for twenty-four hours at 20–25° C., the reaction mixture was stripped of solvent by distillation under vacuum, leaving a brown oily residue which was dissolved in 100 cc. of benzene and washed with dilute aqueous sodium bicarbonate solution. The organic layer was separated, dried over anhydrous magnesium sulfate and stripped of benzene by vacuum distillation. The residual product was a brown, oily liquid having a refractive index $n_D^{25}$ 1.5127.

EXAMPLE 8

*O,O-bis(2-ethylhexyl) S-[2-carbodecyloxy-1-(dicyclohexylcarbamyl)ethyl] dithiophosphate*

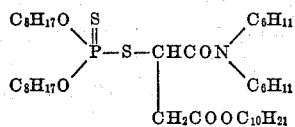

A mixture consisting of 37.6 grams of O,O-bis-(2-ethylhexyl) dithiophosphoric acid (94.5% purity) and 9.8 grams of maleic anhydride was heated with occasional stirring in a 65° C. oven for three hours, and then allowed to stand at room temperature (20–25° C.) for sixteen hours. The product, O,O-bis(2-ethylhexyl) S-(2,5-dioxo-3-oxolanyl) dithiophosphate was a dark brown oily liquid. 45 grams of this product was dissolved in 60 cc. of benzene, and a solution of 18.1 grams of dicyclohexylamine in 40 cc. of benzene was added slowly during a period of one-half hour. The temperature of the mixture rose to about 40° C. during the addition of the amine. Stirring was continued for two hours, followed by the gradual addition of 11.9 grams of thionyl chloride. After stirring for another hour, 15.8 grams of n-decyl alcohol was added dropwise. The reaction mixture was warmed to about 50° C. for two hours, and then allowed to stand at room temperature for three days. The solvent was removed by distillation under vacuum, and the residue was taken up in 100 cc. of benzene and washed twice with dilute aqueous sodium bicarbonate solution. The organic layer was separated, dried over anhydrous magnesium sulfate and stripped of benzene by vacuum distillation. The residual product was a viscous, brown, oily liquid.

Other typical dithiophosphate esters of the present invention are:

*O,O-dimethyl S-[2-carbopropoxy-1-(N-methyl-N-phenylcarbamyl)ethyl] dithiophosphate*

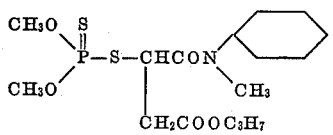

*O,O-dibutyl S-[2-carbethoxy-1-(dodecylcarbamyl)ethyl] dithiophosphate*

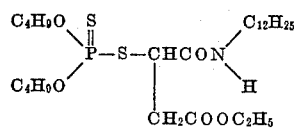

*O,O-didecyl S-[2-carbotetradecyloxy-1-(p-tolylcarbamyl)ethyl] dithiophosphate*

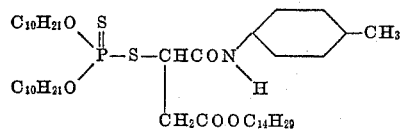

*O,O-diethyl S-[2-carbobutoxy-1-(didodecylcarbamyl)ethyl] dithiophosphate*

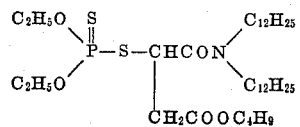

O,O-diphenyl S-[1-(butylcarbamyl)-2-carbethoxyethyl] dithiophosphate

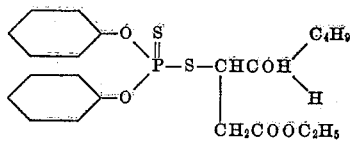

O,O-dioctadecyl S-[2-carbethoxy-1-(phenylcarbamyl)ethyl] dithiophosphate

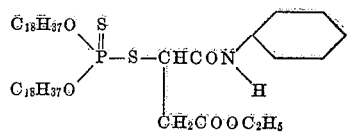

O,O-di-p-tolyl S-[2-carbopropoxy-1-(octylcarbamyl)ethyl] dithiophosphate

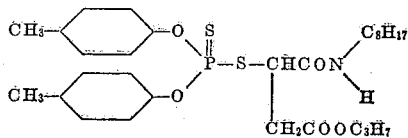

While the invention has been described with particular reference to specific embodiments, it is to be understood that it is not to be limited thereto but is to be construed broadly and restricted solely by the scope of the appended claims.

We claim:
1. A dithiophosphate ester of the formula

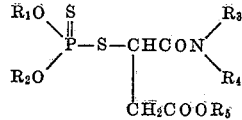

wherein $R_1$, $R_2$ and $R_3$ are selected from the group consisting of alkyl and aryl hydrocarbon radicals, and $R_4$ and $R_5$ are selected from the group consisting of hydrogen and alkyl radicals.

2. O,O-diethyl S-[2-carbethoxy-1-(ethylcarbamyl)ethyl] dithiophosphate.

3. O,O-dipropyl S-[2-carbethoxy-1-(ethylcarbamyl)ethyl] dithiophosphate.

4. O,O-diethyl S-[2-carbethoxy-1-(p-chlorophenylcarbamyl)ethyl] dithiophosphate.

5. O,O-diethyl S-[2-carbobutoxy-1-(diethylcarbamyl)ethyl] dithiophosphate.

6. O,O-bis(2-ethylhexyl) S-[2-carbodecyloxy-1-(dicyclohexylcarbamyl)ethyl] dithiophosphate.

JOHN H. FLETCHER.
ERICK I. HOEGBERG.

REFERENCES CITED

The following references are of record in the file of this patent:

UNITED STATES PATENTS

| Number | Name | Date |
|---|---|---|
| 2,494,283 | Cassaday | Jan. 10, 1950 |
| 2,578,652 | Cassaday | Dec. 18, 1951 |